United States Patent [19]

Kumar

[11] 4,376,134

[45] * Mar. 8, 1983

[54] LOW-CHOLESTEROL SAUSAGE ANALOG AND PROCESS THEREFOR

[75] Inventor: Surinder Kumar, Buffalo Grove, Ill.

[73] Assignee: The Quaker Oats Company, Chicago, Ill.

[ * ] Notice: The portion of the term of this patent subsequent to Dec. 11, 1996, has been disclaimed.

[21] Appl. No.: 288,091

[22] Filed: Jul. 28, 1981

Related U.S. Application Data

[63] Continuation-in-part of Ser. No. 36,348, May 7, 1979, abandoned.

[51] Int. Cl.$^3$ .............................................. A23J 3/00
[52] U.S. Cl. ................................... 426/656; 426/657; 426/104; 426/802
[58] Field of Search ............... 426/104, 574, 656, 657, 426/802

[56] References Cited

U.S. PATENT DOCUMENTS

| | | | |
|---|---|---|---|
| 3,719,499 | 3/1973 | Hai et al. | 426/802 X |
| 3,900,576 | 8/1975 | Schultz | 426/656 X |
| 3,922,352 | 11/1975 | Tewey et al. | 426/574 X |
| 4,133,897 | 1/1979 | Flanyak et al. | 426/250 |
| 4,143,164 | 3/1979 | Shanbhy et al. | 426/802 |
| 4,178,394 | 12/1979 | Kumar | 426/656 |

*Primary Examiner*—Esther M. Kepplinger
*Attorney, Agent, or Firm*—Karen E. Ayd

[57] ABSTRACT

A process is disclosed for producing a simulated sausage product that resembles the natural product in appearance, cooking characteristics, flavor, eating qualities and texture. The simulated sausage is produced by hydrating textured vegetable protein with an aqueous solution containing flavors, spices, and coloring, followed by mixing with a heat denaturable protein ingredient, a soluble sugar system that browns upon heating, and sodium caseinate. To this mixture, a fat system is added. The mixture is then formed into sausage like patties or links and may be heat treated before storage.

1 Claim, No Drawings

LOW-CHOLESTEROL SAUSAGE ANALOG AND PROCESS THEREFOR

CROSS REFERENCE TO RELATED APPLICATIONS

This application is a Continuation-in-Part of U.S. application Ser. No. 036,348 filed May 7, 1979, now abandoned.

BACKGROUND OF THE INVENTION

1. Field of the Invention

This invention relates to a sausage analog that resembles the natural product in appearance, cooking characteristics, flavor, eating qualities and texture but has the added advantage of containing no or low cholesterol and less saturated fat. The invention further relates to a process for preparing simulated sausage products.

2. Description of the Prior Art

A majority of the world's population like the taste of meat and associates meat products with high nutrition. However, the rapidly increasing population of the world has adversely affected the per capita supply of meat products. The increasing demand of a finite supply of meat products is inflating the cost of meat beyond the affordable range of a majority of people. On the other hand, affluent countries, where a large portion of the diet consists of meat products, are suffering from increased incidence of coronary artery disease although the relationship between diet and arteriosclerosis is not completely clear, many scientists believe that high intakes of saturated fats and cholesterol from meat is a major contributing cause. Therefore, people in affluent countries as well as those in underdeveloped countries may have to depend upon foods from non-animal sources fabricated to suit already developed taste for meat.

The preparation of meatlike food products from other protein sources has long been an aim of the food industry. For the past several years, food scientists have been attempting to develop meat analogs that resemble natural meats in appearance, texture, eating qualities, flavor and color. Extensive deviations in technique and formulation are necessary depending upon the meat product to be simulated.

One technique for producing meat analog products is the fiber spinning technique. The fiber spinning technique is an adaptation of the spun fiber method of making synthetic fibers utilized in the textile industry. In this method, a viscous protein solution is prepared which is extruded through spinnerettes into an acid-coagulating bath which causes precipitation into a filament form. These filaments are assembled into a meatlike product by the incorporation of binding materials. Boyer, U.S. Pat. No. 2,682,466 patented June 29, 1954 is considered the forerunner in this technique. However, since that time numerous patents have been issued employing spinnerettes, including Westeen et al. U.S. Pat. No. 3,118,959; Kuramoto et al. U.S. Pat. No. 3,177,079; Dechaine, U.S. Pat. No. 3,269,841; Page et al., U.S. Pat. No. 3,403,027; and Boyer et al., U.S. Pat. No. 3,468,669.

Another series of patents have been issued in the formation of a "chewy protein gel" by using various techniques to form meat-like products. The patentees, Anson and Pader, holders of U.S. patents including U.S. Pat. Nos. 2,802,737; 2,813,024; 2,813,025; 2,830,902 and 2,833,651 have taught forming a solution of protein (soy or peanut concentrates) which is then precipitated under agitation at elevated temperature by lowering the pH of the solution to about 6.0. The resulting precipitate may then be admixed with a binder and stirred into a uniform piece which can be shaped into any form desired, such as strands. The resulting strands are autoclaved with steam to give rise to the final product.

Kjelson, U.S. Pat. No. 3,343,963, patented Sept. 26, 1967 teaches formation of high protein food products resembling chopped ground meats. A source of spun edible protein fibers is bound together with a binder consisting of albumen, gluten and particular oilseed material. The composition is heat-set to form the simulated meat product.

Hartman, U.S. Pat. No. 3,320,070, patented May 16, 1967, has taught formation of bacon-like products from man made fibers of natural vegetable protein with a binder including albumen, and edible proteins. The bacon-like product is formulated with lean and non-lean portions so as to simulate real bacon.

More recently, Leidy et al., in U.S. Pat. Nos. 3,711,291; 3,713,837; 3,719,498; and British Pat. No. 921,756 have taught various methods of making sausage analogs from a heat settable "gel precursor".

Other U.S. patents of interest are: Hai et al., U.S. Pat. No. 3,719,499; Leidy et al., U.S. Pat. No. 3,840,677 and Yang et al., U.S. Pat. No. 3,814,823.

Other patents such as Flanyak et al., U.S. Pat. No. 4,133,897 require the addition of gluten to provide chewy texture and require a lengthy heating step in the process. The present invention results in a highly acceptable sausage analog with aroma, flavor, texture, and frying properties similar to real sausage utilizing a relatively simple process.

While these prior art attempts may in a generic sense simulate sausage and other meat products, no known process has been developed which will allow the production of meat analogs which are low in cholesterol, have the appearance as well as the chewiness, biting properties, juiciness, mouth lubrication, cohesion and frying properties of real meat products. The present invention is concerned with alleviating these shortcomings of the prior art, and providing a low-cholesterol sausage analog simiar to the real sausage in appearance, frying properties, flavor and textural characteristics.

SUMMARY OF THE INVENTION

It is, therefore, an object of the present invention to provide a sausage analog that resembles the natural product in appearance, cooking characteristics, flavor, eating qualities and texture.

Another object of this invention is to provide a sausage analog having a low cholesterol and saturated fat content.

Still another object of this invention is to provide a method of producing a sausage analog having properties of real sausage.

Still a further object of the present invention is to produce meat-like products from proteinaceous raw materials.

A still further object of this invention is to provide a processed sausage analog having a high protein content and a low fat content.

The objects of this invention are accomplished by a process for the production of a sausage analog resembling the natural product in appearance, cooking characteristics, flavor, eating qualities and texture, said process comprising:

a. providing an aqueous mixture of ingredients selected from the group consisting of flavors, spices, and coloring agents;
b. admixing textured vegetable protein with the aqueous mixture from step a;
c. adjusting the temperature of the admixture of step b to a temperature above 140° F., to allow for hydration;
d. providing a dry mixture of ingredients selected from the group consisting of egg white solids, non-fat dry milk, sodium caseinate and sugar;
e. admixing the dry mixture with the admixture of step c;
f. admixing melted fat and/or oil with the admixture of step e;
g. adjusting the temperature of the step e admixture to a temperature of 60° F. or lower.

The present invention can be employed to make products resembling a wide variety of meat products.

The novel features of the invention, both as to the product and method of making such product, together with the further objectives and advantages thereof, will be better understood from the following description in which a preferred method of practicing the invention is illustrated.

DETAILED DESCRIPTION OF THE INVENTION

The first step in the preparation of the sausage analog of this invention is the formation of an aqueous mixture of flavors, spices, and coloring agents, hereinafter referred to as a flavor solution. The flavor solution is prepared by mixing flavors, spices and coloring agents with water in a mixer or blender. The flavors, spices and coloring agents may be mixed with cold, warm or hot water. Uniformity of suspension is increased as the temperature of water and the amount of mixing is increased. Flavors that are fat based are easily mixed with water at temperatures above the melting point of the fat. In the preferred embodiment of my invention, the flavors, colors, and spices, are mixed with water at a temperature above 140° F. The flavor solution can comprise from 60–80 percent by weight water, from 15–30 percent by weight flavors, from 0–6.0 percent by weight spices, and from 0–3.0 percent by weight coloring agents. Based on the weight of the final product, the aqueous mixture comprises from 30–70 percent by weight water, 1–10 percent by weight flavors, 0–4 percent by weight spices, and from 0–0.3 percent by weight coloring agents.

The second step in the preparation of the sausage analog is the addition of textured vegetable protein to the flavor solution, thereby causing hydration of the textured vegetable protein. Hydration refers to uptake of water by the textured protein material, so that there is no free visible water when water and textured vegetable protein are mixed. Normally, textured vegetable protein can absorb from two to four times its weight of water. Textured weight proteins from various sources differ in their time-temperature requirements for optimum hydration. However, it is well known in the art that the process of hydration can be hastened by increasing the water temperature. Hydration of the textured soy protein concentrate used in my process requires 5 to 10 minutes of holding time with constant application of heat so as to keep the temperature of the water-textured protein mixture above 200° F. A holding time of less than 5 minutes yields a tough final product and does not allow for the desired amount of water absorption. A holding time of more than 10 minutes with application of heat causes breakdown of the protein network, thus, softening the product and reducing the bite resistance of sausage analog.

Thus, the addition of the textured protein to the aqueous flavor solution allows for absorption of water that is necessary for a desirable texture of the sausage analog and helps in the formation of a discontinuous water phase which contributes to the juiciness of the sausage analog and is retained by the sausage analog product even during frying.

The textured protein can be any plant protein that is texturized. Preferably, the protein material is an oilseed, solvent extracted, plant protein such as soy protein isolate, soy flour or soy protein concentrate. Other oilseed vegetable proteins, solvent extracted to concentrate the protein therein, are also highly acceptable, such as peanut and sesame seed protein and the other oilseed vegetable proteins. The textured protein can also be oat protein or animal protein selected from the group consisting of collagen, gelatin, egg albumin, milk protein, non-fat dry milk and lactalbumin. It is preferred that the protein material contain at least about 25 percent by weight protein. With textured soy protein concentrate, I have found that ratios from 1:2–1:5 of textured soy protein concentrate to flavor solution gives a highly satisfactory result.

The third step in the preparation of the sausage analog is the addition of fibrous food material to the hydrated textured vegetable protein. In real sausage, fibrous material is the connective tissue which provides cohesion and bite resistance. For preparing a sausage analog, that is similar in appearance and other properties, addition of edible fibrous material is desirable. I have found that spun protein fiber, structured protein fiber or ground collagen can be used satisfactorily. These may be added individually or in any combination to the textured protein during or after hydration. The preferred fibrous material for use in this invention is structured soy protein isolate. It is also preferable that the length of the fibrous material be between $\frac{1}{8}$" and 1", that the protein content of the fiber be about 30–35 percent and the protein fiber be adjusted to room temperature before mixing with the hydrated textured vegetable protein. The preferred quantity of the fibrous material is 0–15 percent by weight of the final product. However, an acceptable product can be made using 5–10 percent by weight. An acceptable product can also be made using 7–8 percent by weight fibrous food material.

The fourth step in the preparation of the sausage analog is the addition of a liquified fat and/or oil component to the above mixture. The temperature of the fat and/or oil component is adjusted to a temperature greater than or equal to its melting point, such that the fat and/or oil component is liquid upon addition to the textured vegetable protein mixture. An equal mixture of high melting (90°–110° F. melting point) intermediate melting (70°–90° F.) and low melting (oils, liquid at room temperature) fats was selected for use in the sausage analog. An acceptable product can also be made wherein the fat or oil component is a blend consisting of one or more fats wherein the melting point of the fats ranges from 30°–110° F. During frying, the low melting point fat or oil lubricates the frying pan at low temperature and thereby sticking of the product to the pan is avoided. Furthermore, low melting point fat remains liquid at room temperature and continues to provide the mouth lubricating characteristic as the product cools down after frying. In general, doctors recommend consumption of polyunsaturated fatty acids which are also provided in higher proportions by low-melting vegetable oils such as corn oil. High melting point fats are added to keep the sausage analog in a semi-solid mass. Furthermore, during frying, controlled release of fat is desirable. If only low melting point fat were used, the fat release would be too fast, causing suspension of solids in a continuous liquid fat phase. The amount of fat added in our product at this point varies from 5–30 percent of the final product, 7–8 percent being preferred.

The fifth step in the preparation of the sausage analog is the addition of a binder system and browning components. To simulate the cohesive properties of sausage, a binder system that gels upon heating is desirable. In my product, I have used a binder system consisting of a mixture of egg white solids, and sodium caseinate. At this point, ingredients that help in browning of the sausage analog are also added. My mixture consists of 0–7 percent by weight egg white solids, 0–1 percent by weight non-fat dry milk, 0–8 percent by weight sodium caseinate and dextrose at 0–5 percent based on the weight of the final mix. Although the above composition is preferred, the composition may be varied to provide 3–7 percent egg white solids, 0–5 percent non-fat dry milk, 0–5 percent sodium caseinate and 0–5 percent dextrose in the final mix.

The binder and browning system is added to the mix from Step 4 with constant mixing. The temperature of the mix from Step 4 should be lower than 160° F. to prevent denaturation of egg white. After the addition of the binder system, the mix is cooled to 50°–80° F.; 65° F. being the optimum temperature.

The sixth step in the preparation of the sausage analog is the addition of fat. The temperature of the fat blend described in Step 4 is adjusted to 100° F. and half the fat blend may be added at this point. The fat blend is a liquid at 100° F. Although, it is not necessary to have this step, I have found that addition of half the total fat in Step 4 and the remaining half in Step 6 improves the frying characteristics and juiciness of the product. This is probably due to the fact that most of the fat added in Step 4 is absorbed in the textured vegetable protein and is further bound by the binder system whereas the fat added in Step 6 remains free. It is however, possible and conceivable to add the entire fat at Step 4 or Step 6 and still obtain an acceptable product.

The seventh step in the preparation of the sausage analog is the addition of chilled water or ice. To the mix from Step 6 is then added chilled water or ice to approximately 10 percent of the final product. The contents are mixed until distinct solid fat particles are seen in the mix.

The sausage analog made from the above procedure will have the following composition:

| Ingredient | Percent Range |
| --- | --- |
| Textured Soy Protein | 5–20 |
| Structured Protein Fiber | 0–15 |
| Collagen Fiber | 0–15 |
| Fat | 10–30 |
| Egg White Solids | 4–7 |
| Non-fat Dry Milk | 0–2 |
| Dextrose | 0–2 |
| Sodium Caseinate | 0–2 |

-continued

| Ingredient | Percent Range |
| --- | --- |
| Flavors | 2–10 |
| Spices | 0–2 |
| Water | 30–70 |
| Coloring Agent | 0–0.1 |

The above sausage analog mixture may be formed into patties or further processed into sausage-like links in the following manner.

The mix is stuffed into ½" edible collagen casing and the casing is twisted or tied at 4–5" intervals. These links are then treated with live steam in a batch type operation or in a continuous conveyer type steam tunnel. The total time required for gelling the heat-denaturable binder system is from 1 to 5 minutes. The steam temperature used is from 212°–230° F. The internal temperature of the links should be no less than 150° F. to obtain a desired final texture, the optimum temperature being 165° F. The links are then cooled and stored under refrigeration.

The following examples are offered to illustrate but not limit the process of this invention. Unless stated to the contrary, all percentages are given by weight.

EXAMPLE 1

The following ingredients were weighed and mixed

| | | | |
| --- | --- | --- | --- |
| 1. | Water | 72 | lbs. |
| 2. | Meat flavors | 15.6 | lbs. |
| 3. | Mono Sodium Glutamate | 0.4 | lbs. |
| 4. | Dextrose | 1.0 | lbs. |
| 5. | Spices | 0.9 | lbs. |
| 6. | Caramel Color | 0.1 | lbs. |

The aqueous mixture was heated in a steam-jacketed kettle with continuous stirring so as to dissolve or suspend all ingredients uniformly.

To the above mixture, 21 lbs. of textured soy protein concentrate was added and the contents were mixed to uniformly hydrate and flavor the textured protein.

Separately, three commercial fats were mixed with different melting points. One fat had a melting point of 108°–110° F., the second with a melting point of 90°–92° F., and the third being corn oil. This was done to provide desired saturated:unsaturated fatty acid ratio and to obtain a fat mix with a wide range of melting points. Equal parts of these three fats were heated to melt the solid fats and to obtain a uniform mix of these fats. The mixture was cooled to 100° F., a temperature above the melting point of the fat blend. Fifteen pounds of this fat blend was added to the hydrated textured protein and the contents were mixed and adjusted to about 100° F.

A dry blend of ingredients with the following composition was then added:

| Egg White Solids | 10 lbs |
| --- | --- |
| Non-fat Dry Milk | 1.8 lbs |
| Dextrose | 2.0 lbs |
| Sodium Caseinate | 1.6 lbs |

The contents were mixed again until a uniform mix was obtained. The mix was then cooled to 65° F. and 15 lbs. of the fat blend (temp. 70°–100° F.) was added and mixed.

To the mix 20 lbs. of crushed ice was added and mixing continued until small globules of fat were visible. This constitutes the base product mix.

The product mix was then stuffed into ½" diameter collagen casing and the casing was twisted or tied at 5" length intervals. The stuffed product was treated with steam for 1–5 minutes so as to gel the heat denaturable protein (egg white). The links were then cooled immediately in chilled water (32°–34° F.). Individual links were separated, packed and stored under refrigerated conditions.

The product when cooked was similar to real sausage in appearance, flavor, textural and frying characteristics.

EXAMPLE 2

The base product was prepared in a manner similar to that described in Example 1.

In a separate container, the following ingredients were weighed and mixed:

| | | |
|---|---|---|
| Mechanically deboned chicken meat | 20 | lbs. |
| Spices | 0.4 | lbs. |
| Salt | 0.3 | lbs. |

The above mix was blended with 80 lbs. of base sausage mix. The resulting product can be formed into patties or stuffed in edible collagen casing and steam treated for 2 minutes to obtain links. Upon frying, the product was similar to real sausage except that it contains less cholesterol and less saturated fat as compared with real pork sausage.

EXAMPLE 3

The sausage like mix was prepared in a manner similar to that in Example 1. The mix was blended with equal amount of real pork sausage, stuffed into links, steam treated, chilled and packed. The resulting product has half the cholesterol of real pork sausage and is similar in flavor, texture and cooking characteristics to the real product.

EXAMPLE 4

Same as Example 3 except that the sausage-like mix was mixed with equal weight of ground beef prior to stuffing.

I claim:

1. A process for the production of a low cholesterol sausage analog resembling the natural product in appearance, cooking characteristics, flavor, eating qualities, and texture, said process consisting essentially of:
   a. providing an aqueous mixture of ingredients selected from the group consisting of from 60–80 percent by weight water, from 15 to 30 percent by weight flavors, from 0 to 6.0 percent by weight spices, from 0–3.0 percent by weight coloring agents and combinations thereof;
   b. providing a dry mixture of ingredients selected from the group consisting of 0–7 percent egg white solids, 0–5 percent non-fat dry milk, 0–8 percent by weight sodium caseinate, 0–5 percent by weight sugar and combinations thereof;
   c. admixing textured protein with the aqueous mixture thereby forming a first admixture;
   d. forming a second admixture by admixing with said first admixture, 5–30 percent by weight of a blend of fats and oils wherein said blend contains equal amounts of (i) a high melting point fat selected from the group of fats having melting points in the range 90°–110° F., (ii) an intermediate melting point fat selected from the group of fats having melting points in the range 70°–90° F., and (iii) a low melting point fat or oil which is a liquid at room temperature; wherein said blend is at a temperature greater than or equal to the melting point of said blend during the admixing step;
   e. admixing the dry mixture with the second admixture thereby forming a third admixture; and
   f. adjusting the third admixture to a temperature of 60° F. or lower.

* * * * *